United States Patent
Cho et al.

(10) Patent No.: US 12,020,558 B2
(45) Date of Patent: Jun. 25, 2024

(54) WORK ZONE ALERT SYSTEM AND METHOD

(71) Applicant: GEORGIA TECH RESEARCH CORPORATION, Atlanta, GA (US)

(72) Inventors: Yong Cho, Atlanta, GA (US); Pileun Kim, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 286 days.

(21) Appl. No.: 17/440,263

(22) PCT Filed: Mar. 18, 2020

(86) PCT No.: PCT/US2020/023248
§ 371 (c)(1),
(2) Date: Sep. 17, 2021

(87) PCT Pub. No.: WO2020/190988
PCT Pub. Date: Sep. 24, 2020

(65) Prior Publication Data
US 2022/0157135 A1    May 19, 2022

Related U.S. Application Data

(60) Provisional application No. 62/820,034, filed on Mar. 18, 2019.

(51) Int. Cl.
*G08B 5/00* (2006.01)
*G01S 17/86* (2020.01)
(Continued)

(52) U.S. Cl.
CPC .............. *G08B 5/006* (2013.01); *G01S 17/86* (2020.01); *G08B 13/1609* (2013.01); *G08B 13/187* (2013.01)

(58) Field of Classification Search
CPC .. G08B 5/006; G08B 13/1609; G08B 13/187; G01S 17/86; G01S 17/88
See application file for complete search history.

(56) References Cited

U.S. PATENT DOCUMENTS 7,088,284 B2    8/2006   Young
9,728,085 B2    8/2017   Schwarz et al.
(Continued)

FOREIGN PATENT DOCUMENTS

CN          1426030 A  *  6/2003  ........... G08B 25/012
WO    WO-2008127752 A2 * 10/2008  ................ B60T 7/22

OTHER PUBLICATIONS

International Search Report and Written Opinion dated Jun. 10, 2020, from International Application No. PCT/US2020/023248, 9 pages.

*Primary Examiner* — Andrew W Bee
(74) *Attorney, Agent, or Firm* — Meunier Carlin & Curfman LLC

(57) ABSTRACT

An exemplary method and system is disclosed that facilitates a readily-re-deployable and self-enclosed geofencing and proximity-based intrusion sensing and alerting system in a roadway or construction work zone. The sensing and alerting system is configured in the form factor of a safety cone, barricade or drum to sense and uses acoustic-echoes or LiDAR-based sensing to detect intruders that are in proximity to the sensing and alerting system to generate a siren or loud audible alert, as well as flashing lights, to warn workers of such intrusion.

20 Claims, 10 Drawing Sheets

(51) Int. Cl.
*G08B 13/16*      (2006.01)
*G08B 13/187*     (2006.01)

(56)               References Cited

U.S. PATENT DOCUMENTS

| | | | |
|---|---|---|---|
| 9,940,839 | B2 | 4/2018 | Stafford et al. |
| 11,714,193 | B1 * | 8/2023 | Foster .................. G01S 7/4972 |
| | | | 356/4.01 |
| 2018/0347752 | A1 * | 12/2018 | Costello .................. G01S 17/89 |
| 2019/0049958 | A1 * | 2/2019 | Liu ........................ G01S 17/00 |
| 2019/0259256 | A1 * | 8/2019 | Fairweather ............ E01F 9/654 |
| 2020/0020219 | A1 * | 1/2020 | Ashar .................... G08B 21/00 |
| 2020/0160725 | A1 * | 5/2020 | Derginer ................. G01S 13/86 |
| 2021/0213946 | A1 * | 7/2021 | Adwan ................... G01S 17/66 |
| 2021/0237777 | A1 * | 8/2021 | Selevan ................. G06V 20/58 |

\* cited by examiner

WORK ZONE ALERT SYSTEM AND METHOD

CROSS-REFERENCE TO RELATED APPLICATION

This is a US national stage application of International PCT application no. PCT/US2020/023248, filed Mar. 18, 2020, entitled "Work Zone Alert System and Method," which claims priority under 35 U.S.C § 119(e) to, and the benefit of, U.S. Provisional Patent Application No. 62/820,034, filed Mar. 18, 2019, entitled "Alert System on Roadway Work Zone," each of which is hereby incorporated by reference herein in its entirety.

FIELD

This disclosure relates to an intrusion alert system, particularly for a work zone alert system.

BACKGROUND

Construction or roadway work zones are dangerous job site areas with workers in such areas being exposed to potential injury and even death from vehicles traveling through the area or from construction equipment and other vehicles and workers also in the job sites. The work zone itself is very complex with the site continually changing in areas that are considered safe and unsafe throughout the day or work shift.

Although there are passive devices available for use in roadway work zones to direct hazard from the worker and to alert drivers of roadway work zones, there are yet no active system available that are practical for use in roadway and other construction work zones. Impact-activated devices are commercially available to enhance safety, but such devise may not provide sufficient time for worker to respond in a meaningful way.

There are opportunities to improve the safety of construction work zones and other hazardous work areas.

SUMMARY

An exemplary method and system is disclosed that facilitates a readily-re-deployable and self-enclosed geofencing and proximity-based intrusion sensing and alerting system in a construction work zone. The sensing and alerting system is configured in the form factor of a safety cone, barricade or drum to sense and uses acoustic-echoes or LiDAR-based sensing to detect intruders that are in proximity to the sensing and alerting system to generate a siren or loud audible alert, as well as flashing lights, to warn workers of such intrusion.

In some embodiments, the sensing and alerting system is configured to operate with other sensing and alerting system to form a short-range low-power mesh network that can propagate the alerts across more than one system. The mesh network may communicate with a gateway that facilitate the monitoring of alerts over a cloud-based of remote monitoring station.

In an aspect, a geofencing alert apparatus is disclosed comprising a short-distance proximity sensor unit attachable to a construction or traffic device, the proximity sensor unit comprising one or more electromagnetic or acoustic-based sensors that are each configured to emit and receive said emitted respective electromagnetic or acoustic waves; a controller coupled to the proximity sensor unit, the controller being configured to generate an alert signal output based on a determined change in the received emitted electromagnetic or acoustic waves from at least one of the electromagnetic or acoustic-based sensor of the proximity sensor unit, wherein the change is indicative of an intruder object or person in a detectable area covered by the emitted electromagnetic or acoustic waves; and one or more alert devices each coupled to the controller, wherein the one or more alert devices is configured to generate warning sound or warning visual output based on the alert signal output.

In some embodiments, the geofencing alert apparatus further includes a high-bandwidth communication device (e.g., Wi-Fi system, cellular system, WiMAX system, Bluetooth system), the controller being coupled to the high-bandwidth communication device to direct a stored intrusion event data set having data acquired from at least the geofencing alert apparatus, through a network associated with the high-bandwidth communication device, to a remote computing device.

In some embodiments, the stored intrusion event data set includes stored intrusion event data collected at a second geofencing alert apparatus operatively communicating with the geofencing alert apparatus.

In some embodiments, the remote computing device comprises a cloud server, a remote server, or a local server, wherein the remote computing device is configured to store the transmitted intrusion event data to be subsequently presented, through curation operation performed by the remote computing device or another computer device, at a monitoring application executing at a monitoring terminal.

In some embodiments, the geofencing alert apparatus further includes a low-power communication device (e.g., Zigbee, Wi-fi, Bluetooth), the controller being coupled to the low-power communication device to establish a plurality of links with one or more second geofencing alert apparatuses (e.g., child devices) to form a mesh network.

In some embodiments, each of the one or more second geofencing alert apparatuses is configured to transmit an intruder event message to the geofencing alert apparatus, the controller being configured to generate the alert signal output based on the received intruder event message.

In some embodiments, each of the one or more second geofencing alert apparatuses comprises a respective construction or traffic device; a respective short-distance proximity-based sensor unit comprising one or more respective electromagnetic or acoustic-based sensors that are each configured to emit and receive said emitted respective electromagnetic or acoustic waves; a respective controller coupled to the respective proximity sensor unit, the controller being configured to determine a change in the received respective emitted electromagnetic or acoustic waves from at least one of the respective electromagnetic or acoustic-based sensor of the respective proximity sensor unit, wherein the change is indicative of an intruder object or person in a respective detectable area covered by the emitted respective electromagnetic or acoustic waves; and a respective low-power communication device to establish a plurality of respective links with other one or more second geofencing alert apparatuses and the geofencing alert apparatus.

In some embodiments, the each of the one or more second geofencing alert apparatuses has a different configuration than the geofencing alert apparatus, including not having included an alert device.

In some embodiments, the controller is configured to establish, through the mesh network, a link with a third geofencing alert apparatus (e.g., another parent device), wherein the third geofencing alert apparatus is identical in mechanical and system configuration to the geofencing alert apparatus.

In some embodiments, the one or more electromagnetic or acoustic-based sensors of the short-distance pulsed-based sensor unit comprises a first stationary electromagnetic or acoustic-based sensor and a second stationary electromagnetic or acoustic-based sensor, wherein the first electromagnetic or acoustic-based sensor is disposed along an outward face of the construction or traffic device at a first radial position and the second electromagnetic or acoustic-based sensor is disposed along the outward face of the construction or traffic device at a second radial position different from the first radial position.

In some embodiments, the first stationary electromagnetic or acoustic-based sensor and the second stationary electromagnetic or acoustic-based sensor each comprises an air-based ultrasonic sensor.

In some embodiments, the short-distance pulsed-based sensor unit comprises the first stationary electromagnetic or acoustic-based sensor, the second stationary electromagnetic or acoustic-based sensor, and a third stationary electromagnetic or acoustic-based sensor, wherein each of the first, second, and third electromagnetic or acoustic-based sensors is disposed along the outward face of the construction or traffic device to provide a coverage around the construction or traffic device of at least about 150 degrees.

In some embodiments, the one or more electromagnetic or acoustic-based sensors of the short-distance pulsed-based sensor unit comprises a first rotatable electromagnetic or acoustic-based sensor, the first rotatable electromagnetic or acoustic-based sensor being coupled along the outward face of the construction or traffic device or on a top portion of the construction or traffic device to sweep the emitted respective electromagnetic or acoustic waves over a defined sweep coverage region around the construction or traffic device.

In some embodiments, the one or more electromagnetic or acoustic-based sensors of the short-distance pulsed-based sensor unit comprises an electromagnetic or acoustic-based sensor array comprising a plurality of electromagnetic or acoustic-based sensors that operates, collectively, to sweep the emitted respective electromagnetic or acoustic waves over a defined sweep coverage region around the construction or traffic device.

In some embodiments, the first rotatable electromagnetic or acoustic-based sensor or the electromagnetic or acoustic-based sensor array is configured for LiDAR operation.

In some embodiments, the controller is configured to direct the proximity sensor unit to emit and receive emitted respective electromagnetic or acoustic waves according to a sensing period selected from the group consisting of: about every 100 milliseconds (ms), about every 200 ms, about every 300 ms, about every 400 ms, about every 500 ms, about every 600 ms, about every 700 ms, about every 800 ms, about every 900 ms, and about every 1000 ms.

In some embodiments, the controller or the proximity sensor unit is configured to perform a mean filtering operation on signals associated with the received emitted sound waves or a data set associated with said signals.

In some embodiments, the geofencing alert apparatus further includes a power unit comprising a rechargeable circuitry coupled to at least one rechargeable battery.

In some embodiments, the geofencing alert apparatus further includes the construction or traffic device.

In another aspect, a method disclosed comprising sensing, at an intruder detection system configured with a form factor of a construction or traffic device, an intrusion event corresponding to a change in received electromagnetic or acoustic waves emitted from the intruder detection system; and generating, at the intruder detection system, a warning sound and/or warning visual output based on the sensing.

In some embodiments, the method further includes transmitting, from the intruder detection system, through a high-bandwidth network, to a remote computing device selected from the group consisting of a cloud server, a remote server, and a local server, intrusion event data set associated with intrusion event collected at the intruder detection system, wherein the remote computing device is configured to store the transmitted intrusion event data set, wherein the transmitted intrusion event data set is subsequently presented, through curation operation performed by the remote computing device or another computer device, at a monitoring application executing at a monitoring terminal.

In some embodiments, the method further includes receiving, at the intruder detection system, from a second intruder detection system communicatively coupled to the intruder detection system over a meshed network, intrusion event messages collected at the second intruder detection system, wherein the transmitted event data set includes the intrusion events information collected at the intruder detection system and intrusion events information collected second intruder detection system.

In another aspect, a cloud-based monitoring system is disclosed comprising a plurality of geofencing alert apparatuses each of the plurality of geofencing alert apparatuses configured in a form-factor of a construction or traffic device, each of the plurality of geofencing alert apparatuses comprising i) a short-distance proximity-based sensor unit having one or more electromagnetic or acoustic-based sensors that are each configured to emit and receive said emitted respective electromagnetic or acoustic waves, ii) a controller configured to generate an alert signal output based on a determined change in the received emitted electromagnetic or acoustic wave from at least one of the electromagnetic or acoustic-based sensor of the proximity sensor unit, wherein the change is indicative of an intruder object or person in a detectable area covered by the emitted electromagnetic or acoustic waves, and iii) a high-bandwidth communication device to direct a stored intrusion event data set having data acquired from at least the geofencing alert apparatus, through a network associated with the high-bandwidth communication device, to one or more servers; the one or more servers configured to store intrusion event data set having data acquired from the plurality of geofencing alert apparatuses, wherein the one or more servers is configured to curate the intrusion event data set to a monitoring application executing at a monitoring terminal.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

The skilled person in the art will understand that the drawings, described below, are for illustration purposes only so.

DETAILED DESCRIPTION

Figure 1:
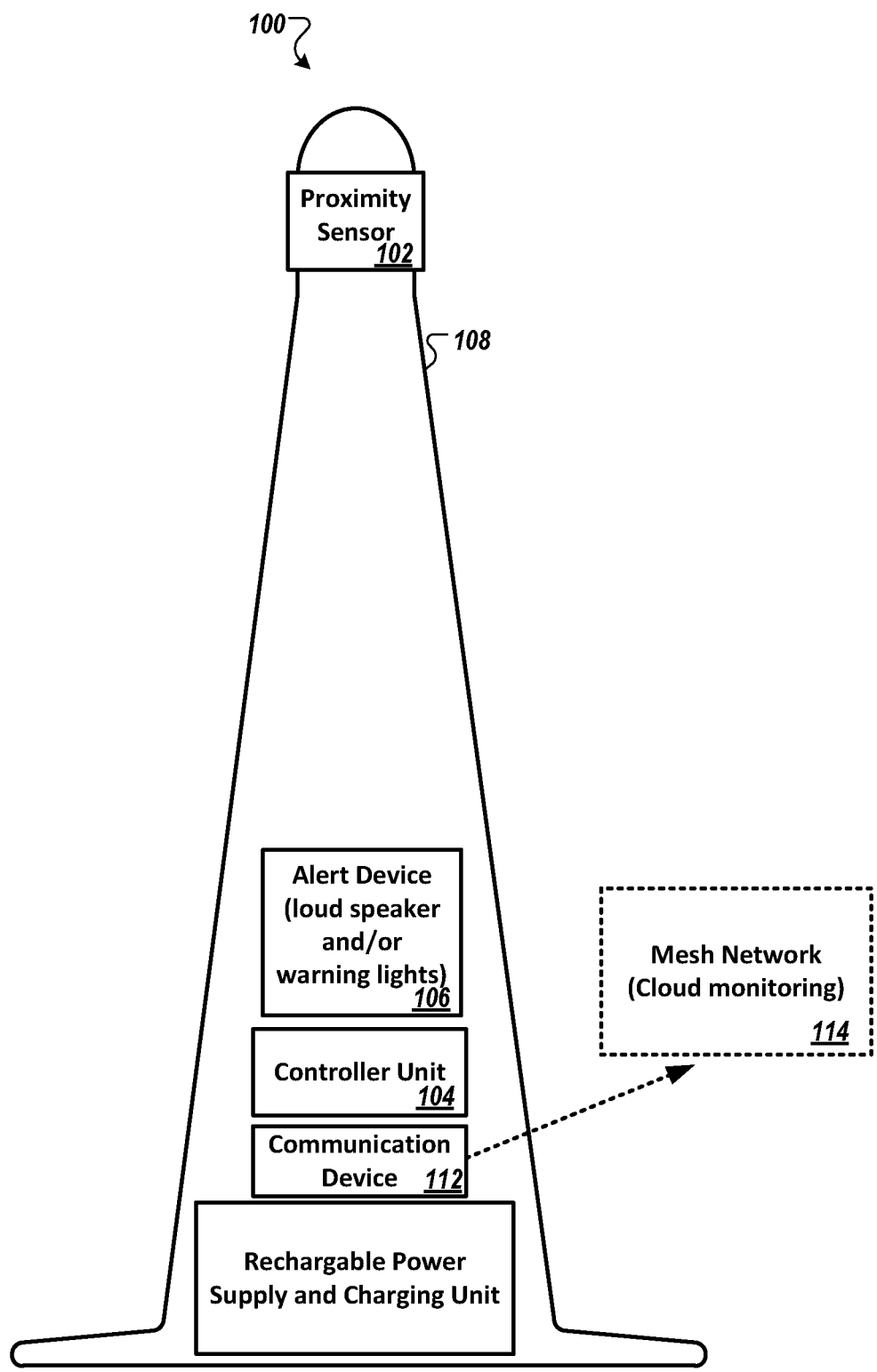
FIG. 1 is an exemplary re-deployable and self-enclosed geofencing and proximity-based intrusion sensing and alerting apparatus in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

In the following description, references are made to the accompanying drawings that form a part hereof and that show, by way of illustration, specific embodiments or examples. In referring to the drawings, like numerals represent like elements throughout the several figures.

Example System

FIG. 1 is an exemplary re-deployable and self-enclosed geofencing and proximity-based intrusion sensing and alerting system unit 100 (also referred to herein as a "geofencing intruder detection system" 100 and "geofencing alert apparatus" 100) in accordance with an illustrative embodiment. As shown in FIG. 1, the geofencing intruder detection system unit 100 includes a short-distance proximity sensor unit 102 (shown as "proximity sensor" 102), a controller 104 (shown within "controller unit" 104), and one or more alert devices 106 (shown as "Alert device (loudspeaker and/or warning lights" 106)).

The short-distance proximity sensor unit 102 is fixably attachable to a construction or traffic device 108 and includes one or more electromagnetic or acoustic-based sensors that are each configured to emit and receive said emitted respective electromagnetic or acoustic waves. The emitted and received electromagnetic or acoustic waves provide an interrogative sensing area in the immediate vicinity of the geofencing intruder detection system unit 100 that forms a detectable area 110 (not shown—see, e.g., FIGS. 3-5 and 9). In some embodiments, the short-distance proximity sensor unit 102 is configured to interrogate the area in 360 degrees. In other embodiments, the short-distance proximity sensor unit 102 is configured to interrogate an effective portion of that, comprising at least 150 degrees. A "construction or traffic device" as used herein can be a construction or traffic cone, barricade, or drum that are typically 2-4 feet in height. The alert device 106 may include one or more visual alert units comprising flashing lights that are at least 6 inches in height. To sufficiently detect an intruder or approaching intruder introducing into the detectable area 110, the sensing period of the short-distance proximity sensor unit 102 is configured, in some embodiments, to be about every 100 milliseconds (ms), about every 200 ms, about every 300 ms, about every 400 ms, about every 500 ms, about every 600 ms, about every 700 ms, about every 800 ms, about every 900 ms, or about every 1000 ms. Indeed, the energy storage of the geofencing intruder detection system unit 100 is suitably sized so the geofencing intruder detection system unit 100 can continuously interrogate at such frequency over the course of one day or a work shift. In some embodiments, the energy storage is sized so the geofencing intruder detection system unit 100 can continuously interrogate at the prescribed frequency for up to a week.

The short-distance proximity sensor unit 102 may be affixed at a top or generally upper region of the construction or traffic device 108 (e.g., at the top half). In some embodiments, the short-distance proximity sensor unit 102 includes a plurality of medium or wide-angled sensing sensors that are positioned on or along an outward face of the construction or traffic device at a plurality of radial positions to form an overlapping sensing and detectable area. In other embodiments, the short-distance proximity sensor unit 102 includes a single wide-angle sensor that is positioned along an outward face of the construction or traffic device to provide the sensing and detectable area. In yet other embodiments, the short-distance proximity sensor unit 102 includes a mechanical or electrical rotatable sensor or sensor array that is configured to sweep around the short-distance proximity sensor unit 102 to form the sensing and detectable area.

Referring still to FIG. 1, the controller 104 is coupled to the proximity sensor unit 102 and is configured to generate an alert signal output based on a determined change in the received emitted electromagnetic or acoustic waves from at least one of the electromagnetic or acoustic-based sensor of the proximity sensor unit 102. The change is indicative of an intruder object or person in the detectable area 110 covered by the emitted electromagnetic or acoustic waves. The controller 104 is configured to store a sensed intruder and/or alert event as an intrusion event data set in local memory. The intrusion event data set may be transmitted to a monitoring station or device when the geofencing intruder detection system unit 100 is connected to a remote computing device 116 (not shown—see FIG. 9) through a network 114 (shown, for example, as "Mesh Network (Cloud Monitoring)" 114).

The one or more alert devices 106 are each coupled to the controller 104 and are configured to generate warning sound or warning visual output based on the alert signal output. In some embodiments, the geofencing intruder detection system unit 100 is configured with a flashing light assembly. The flashing light assembly may be a stacked light device, a LED barricade light, or any suitable traffic or safety-based lighting or signage devices. In some embodiments, the geofencing intruder detection system unit 100 is configured with a siren speaker unit configured to generate a loud single or oscillating tone, e.g., at least 110 dB, that conspicuously indicate a warning to nearby vicinity of the geofencing intruder detection system unit 100.

In some embodiments, the geofencing intruder detection system unit 100 includes a low-power communication device 112. The communication device 112 may be a single protocol or multiple protocol device configured to operate one or more low-power communications protocol such as Zigbee, Tread, Wi-fi, Bluetooth, or the like. The controller 104 may be coupled to the low-power communication device 112 to establish a plurality of links with one or more other geofencing intruder detection system units to form a mesh network. In some embodiments, the network protocol is managed solely by the communication device 112, and the controller serves as a supervisory controller.

In some embodiments, the geofencing intruder detection system unit 100 includes a high-bandwidth communication device 118 (not shown) configured to operatively connect to the remote computing device 116. In other embodiments, the high-bandwidth communication device 118 is configured as an external gateway device that is located external to the geofencing intruder detection system unit 100. The bandwidth communication device 118 may be a Wi-Fi system, cellular system, WiMAX system, or the like. The controller 104 is coupled to the high-bandwidth communication device 112 to direct the stored intrusion event data set having data acquired from at least the geofencing intruder detection system unit 100, through the network 114 associated with the high-bandwidth communication device 112, to the remote computing device 116.

The geofencing intruder detection system unit 100 may operate in single device mode to provide warning with respect to its own detectable area. The geofencing intruder detection system unit 100 may be placed on the ground around or near dangerous equipment to designate the area as a restricted area and to alert workers when coming into the restricted area to prevent against such entry or to inform the worker of the restricted area.

When operating in a system, the geofencing intruder detection system unit 100 may operate with other geofencing intruder detection system units 100. Multiple geofencing intruder detection system units 100 may form an electronic geofence to expand the sensing zone or to define the restricted area. In some embodiments, the geofencing intruder detection system unit 100 may transmit a sensed intruder event to other geofencing intruder detection system units 100 to cause alert warnings to be provided at one or more of the other geofencing intruder detection system units 100 to expand the warning zone. The transmitted event data may be further relayed, in some embodiments, to a remote monitoring system (e.g., cloud-based monitoring system).

Example Method

Figure 2:
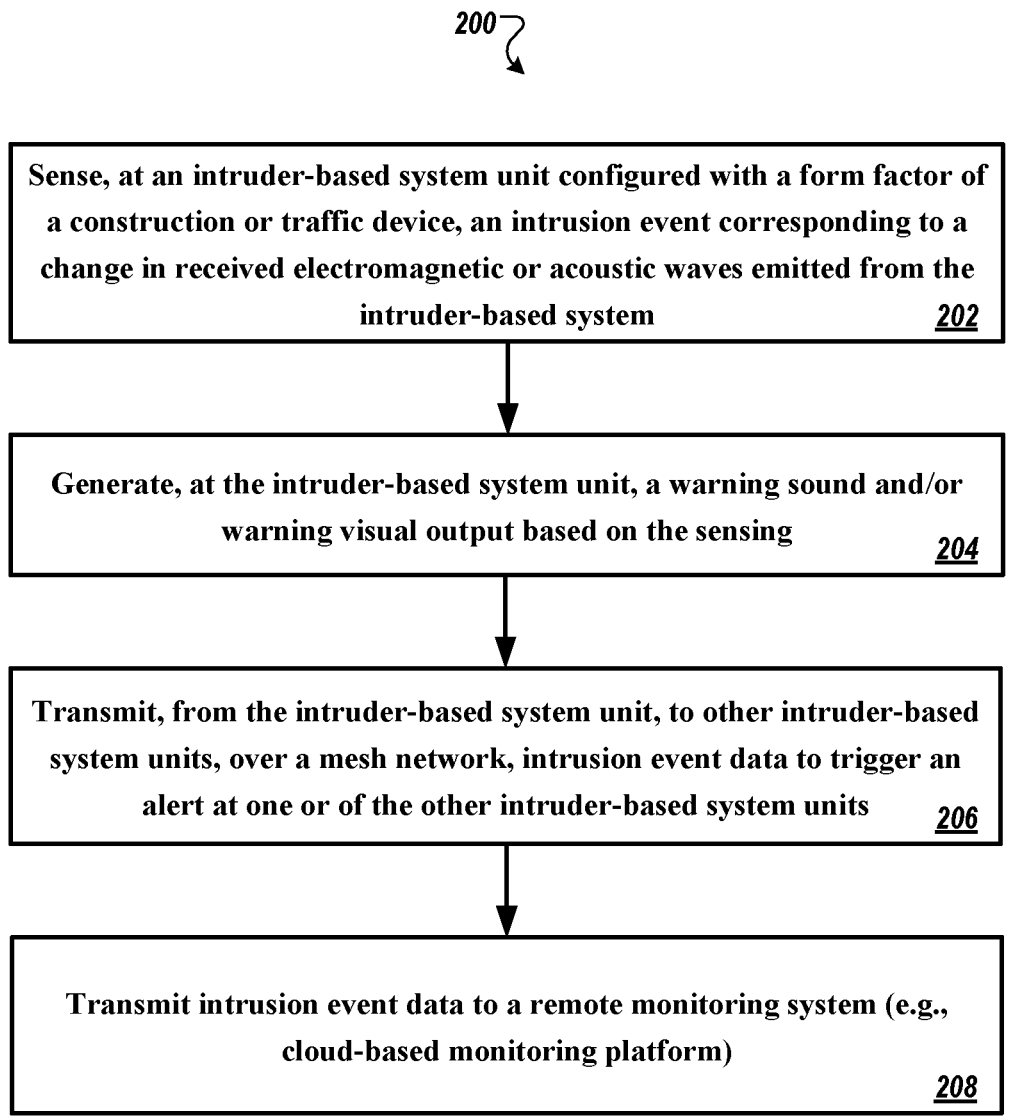
FIG. 2 is an exemplary method of operating the re-deployable and self-enclosed geofencing and proximity-based intrusion sensing and alerting apparatus of FIG. 1 in accordance with an illustrative embodiment.

FIG. 2 is an exemplary method 200 of operating the re-deployable and self-enclosed geofencing and proximity-based intrusion sensing and alerting system of FIG. 1 in accordance with an illustrative embodiment.

As shown in FIG. 2, the method 200 includes sensing (step 202), at an intruder detection system unit (e.g., 100) configured with a form factor of a construction or traffic device, an intrusion event corresponding to a change in received electromagnetic or acoustic waves emitted from the intruder detection-based system unit (e.g., 100). As noted above, the sensing may be performed about every 100 milliseconds (ms), about every 200 ms, about every 300 ms, about every 400 ms, about every 500 ms, about every 600 ms, about every 700 ms, about every 800 ms, about every 900 ms, or about every 1000 ms. The sensing may be performed by the emission and reception of electromagnetic or acoustic waves generated by a short-range proximity sensor (e.g., 102). The sensing distance of the certain short-range proximity sensor, e.g., acoustic-echo based sensing, may be between 1 feet and 20 feet. The sensing distance of the other short-range proximity sensor, e.g., LiDAR (Light Detection and Ranging) sensing may be between 1 feet and 300 feet. Indeed, the alert distance may be set at a distance that is less than the sensing distance.

The method 200 further includes generating (step 204), at the intruder detection system unit (e.g., 100), a warning sound and/or warning visual output based on the sensing. In some embodiments, a warning sound output is generated, e.g., from a siren speaker (e.g., 106). The siren speaker unit may generate a loud single or oscillating tone, e.g., at least 110 dB, that conspicuously indicate a warning to nearby vicinity of the geofencing intruder detection system unit 100.

In some embodiments, a warning visual output is generated, e.g., from a traffic or safety-based lighting or signage devices such as a stacked light device or a LED barricade light. In some embodiments, the visual output may have power of up to 150,000 Candela.

In some embodiments, the method 200 further includes transmitting (step 206) intruder event message, or associated data set, from the intruder detection system unit (e.g., 100) through a low-power communication network to other intruder detection system units. The transmission may be performed over a low-power mesh network established between the intruder detection system unit (e.g., 100) and other intruder detection system units (e.g., 100). Indeed, each of the other intruder detection system units (e.g., as a second geofencing alert apparatus) is configured to transmit an intruder event message to the intruder detection system unit to which the controller is configured to generate the alert signal output based on the received intruder event message.

One or more of the intruder detection system unit and other intruder detection system units may be characterized as a parent safety device while others may be categorized as a child safety device. In some embodiments, all the subsystem in the parent and child safety units as intruder detection system units are the same except sound warning device and high-bandwidth network availability in a parent safety device. In some embodiments, the subsystems of the parent and child safety units may vary though all conforms to a standard application. The parent safety device may communicate with the remote monitoring system to provide updates of current intrusion information to a real-time web database.

Some or each of the one or more other intruder detection system unit (as a child safety device) has a different configuration than the geofencing alert apparatus, including not having included an alert device. In some embodiments, each of the child intruder detection system units is configured with identical or similar mechanical and system configuration to one other. In other embodiments, one or more of the child intruder detection system units are configured with different mechanical or electronic systems though includes a respective construction or traffic device 108 (referred to as 108*b*), a respective short-distance proximity-based sensor unit 102 (referred to as 102*b*), a respective controller 104 (referred to as 104*b*), and a respective low-power communication device 112 (referred to as 112*b*). In some embodiments, the child intruder detection system unit is configured with only sensing and communication subsystems. In other embodiments, the child intruder detection system unit include a reduced set of alert output subsystems (e.g., having a siren speaker or a visual output).

Referring back to FIG. 2, in some embodiments, the method 200 further includes transmitting (step 208) the intrusion event message, or associated data set, to a remote computing device (e.g., 116) that may be a cloud server, a remote server, or a local server. The transmitted message may be a separate message or a same message as that transmitted to the other intruder detection system units, as described in relation to step 206. The remote computing device (e.g., 116) is configured to store the transmitted intrusion event message, or associated data set, which may be subsequently retrieved and presented at a monitoring application executing at a monitoring terminal through curation operation performed by the remote computing device or another back-end computing device. In some embodiments, e.g., when the intruder detection system unit is operating collectively with other intruder detection system units, the intrusion event message, or associated data set, may be combined with other data set collected at the other intruder detection system units to be transmitted to the remote computing device.

Acoustic-Echo-Based Sensing

Figure 3:
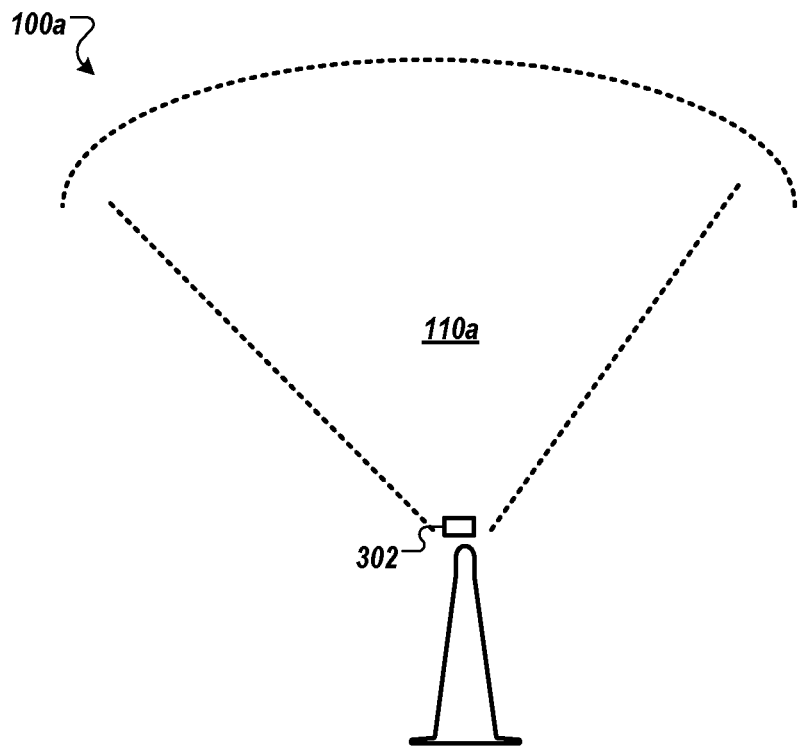
FIG. 3 shows the re-deployable and self-enclosed geofencing and proximity-based intrusion sensing and alerting apparatus of FIG. 1 configured with a rotatable acoustic-echo based sensing unit in accordance with an illustrative embodiment.

FIG. 3 shows the re-deployable and self-enclosed geofencing and proximity-based intrusion sensing and alerting system unit 100 (shown as 100*a*) of FIG. 1 configured with a stationary arrayed electromagnetic or acoustic-echo based sensing unit (shown as 302) in accordance with an illustrative embodiment. The arrayed electromagnetic or acoustic-echo based sensing unit (e.g., 302) is configured with an integrated array of sensors (acoustic-echo based or light-based) to interrogate an area 110 (shown as 110*a*) in vicinity of the intruder detection system unit 100*a*. In some embodiments, the arrayed electromagnetic or acoustic-echo based sensing unit 302 comprises an air-based ultrasonic sensor. In other embodiments, the arrayed electromagnetic or acoustic-echo based sensing unit 302 comprises an infrared or laser-based sensor. In some embodiments, the arrayed sensing unit 302 is configured to provide a coverage around the construction or traffic device of at least about 150 degrees.

Figure 4:
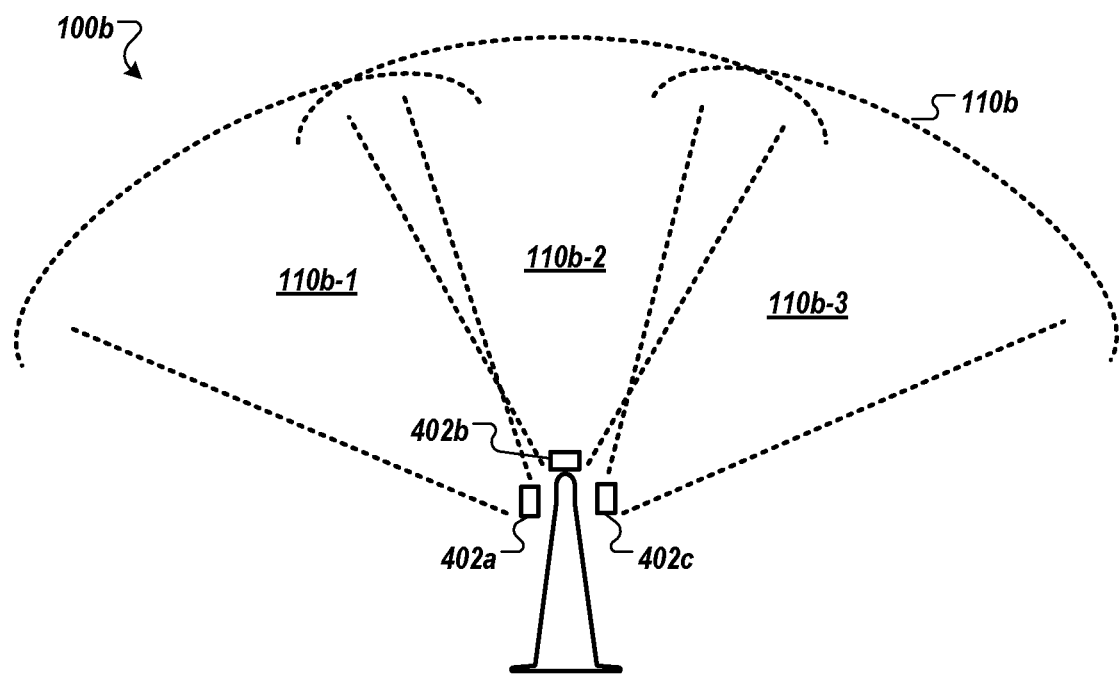
FIG. 4 shows the re-deployable and self-enclosed geofencing and proximity-based intrusion sensing and alerting apparatus of FIG. 1 configured with multi-acoustic-echo based sensing unit in accordance with an illustrative embodiment.

FIG. 4 shows the re-deployable and self-enclosed geofencing and proximity-based intrusion sensing and alerting system unit 100 (shown as 100*b*) of FIG. 1 configured with multi-electromagnetic or acoustic-echo based sensing unit 402 (shown as 402*a*, 402*b*, 402*c*) in accordance with an illustrative embodiment. As shown FIG. 4, the intruder detection system unit 100*b* includes a first stationary discrete electromagnetic or acoustic-based sensor 402 (shown as 402*a*), a second discrete stationary electromagnetic or acoustic-based sensor 402 (shown as 402*b*), and a third discrete stationary electromagnetic or acoustic-based sensor 402 (shown as 402*c*). Each of the sensors (e.g., 402*a*, 402*b*, 402*c*) is disposed along the outward face of the construction or traffic device (e.g., 108) at a plurality of different radial positions (shown as 110*b*-1, 110*b*-2, and 110*b*-3) to provide coverage over a plurality of radial positions to form an overlapping sensing and detectable area 110 (shown as 110*b*). In some embodiments, the multi-sensor sensing unit 402 comprises an air-based ultrasonic sensor. In other embodiments, the multi-sensor sensing unit 402 comprises an infrared or laser-based sensor. In some embodiments, the multi-sensor sensing unit 402 is configured to provide a coverage around the construction or traffic device of at least about 150 degrees.

Light Detection and Ranging (LiDAR)-Based Sensing

Figure 5:
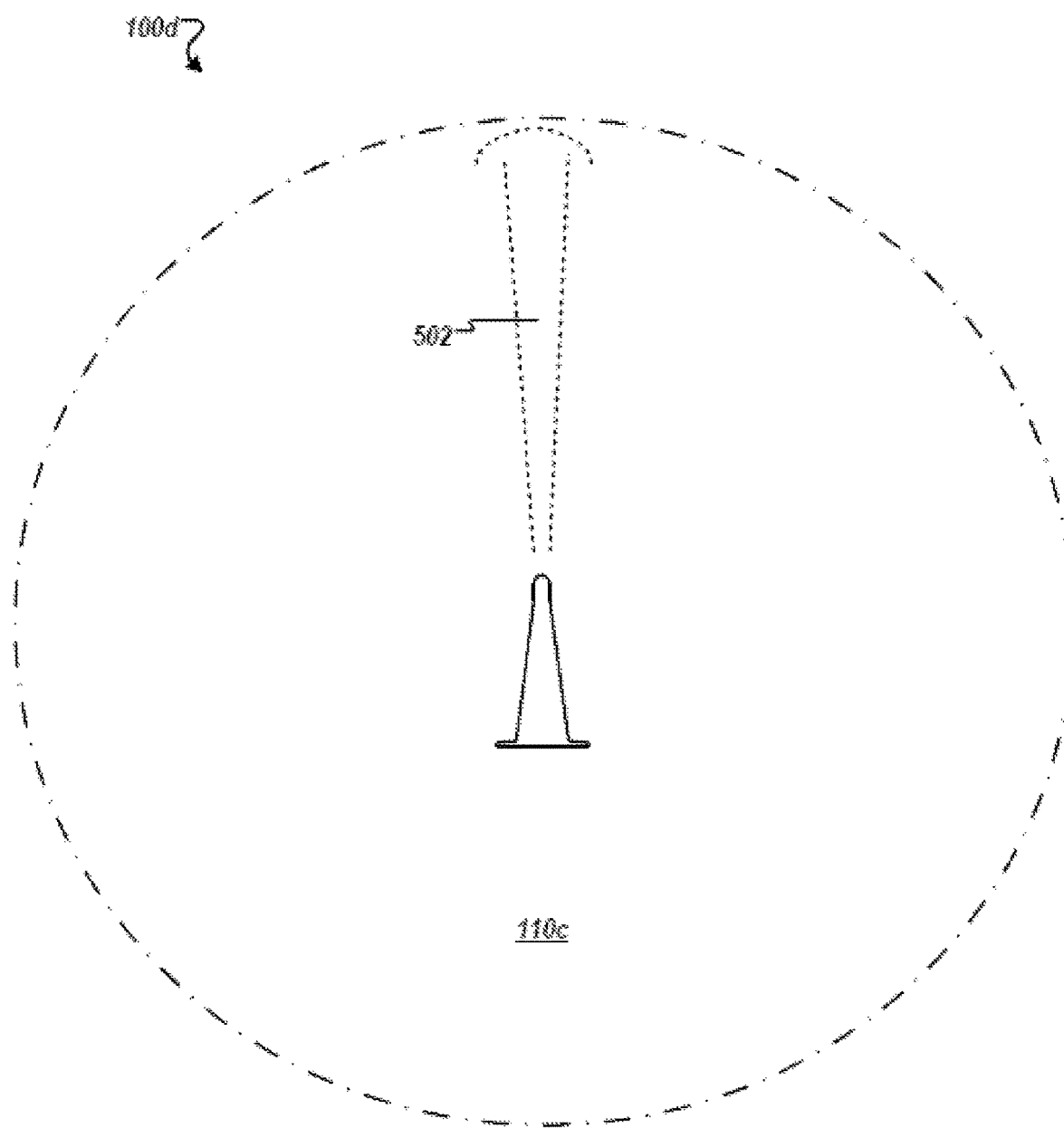
FIG. 5 shows the re-deployable and self-enclosed geofencing and proximity-based intrusion sensing and alerting apparatus of FIG. 1 configured with an LiDAR sensing unit in accordance with an illustrative embodiment.

FIG. 5 shows the re-deployable and self-enclosed geofencing and proximity-based intrusion sensing and alerting system unit 100 (shown as 100*c*) of FIG. 1 configured with an LiDAR sensing unit 500 in accordance with an illustrative embodiment. In some embodiments, the LiDAR sensing unit 500 comprises one or more infrared or laser-based sensors that are mounted to rotating platform that is configured to sweep or rotate around the intruder detection system unit 100*d*. The rotatable electromagnetic or acoustic-based sensor is disposed along the outward face of the construction or traffic device or on a top portion of the construction or traffic device to sweep the emitted respective electromagnetic or acoustic waves (shown as 502) over a defined sweep coverage region 110 (shown as 110*d*) around the construction or traffic device.

Safety Intrusion Cone, Barricade, and Drum

Figure 6:
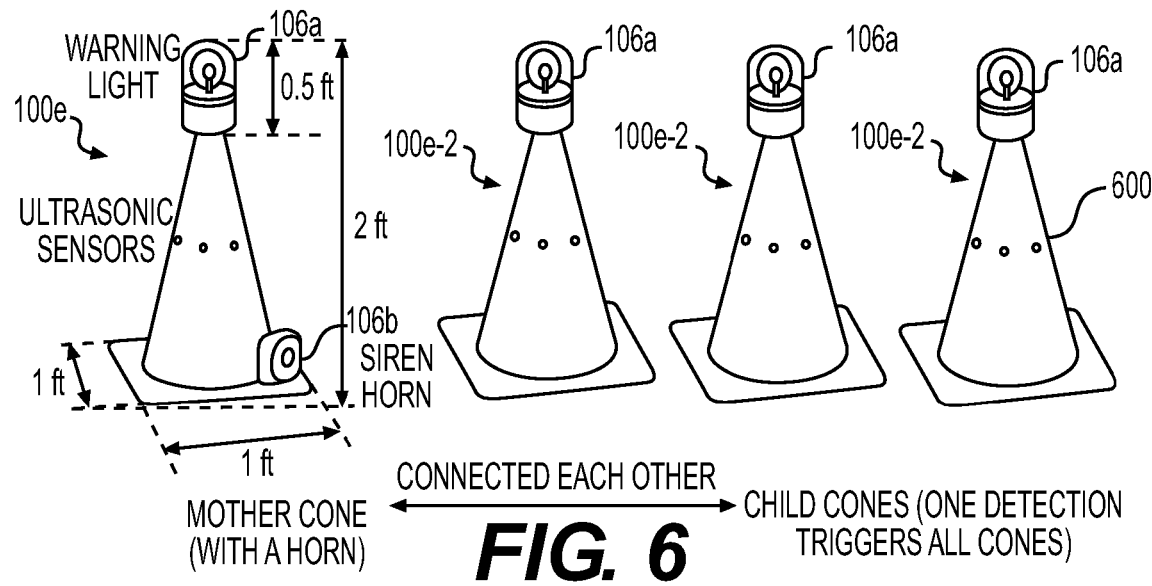
FIG. 6 shows the re-deployable and self-enclosed geofencing and proximity-based intrusion sensing and alerting apparatus of FIG. 1 configured as a safety cone in accordance with an illustrative embodiment.
Figure 7:
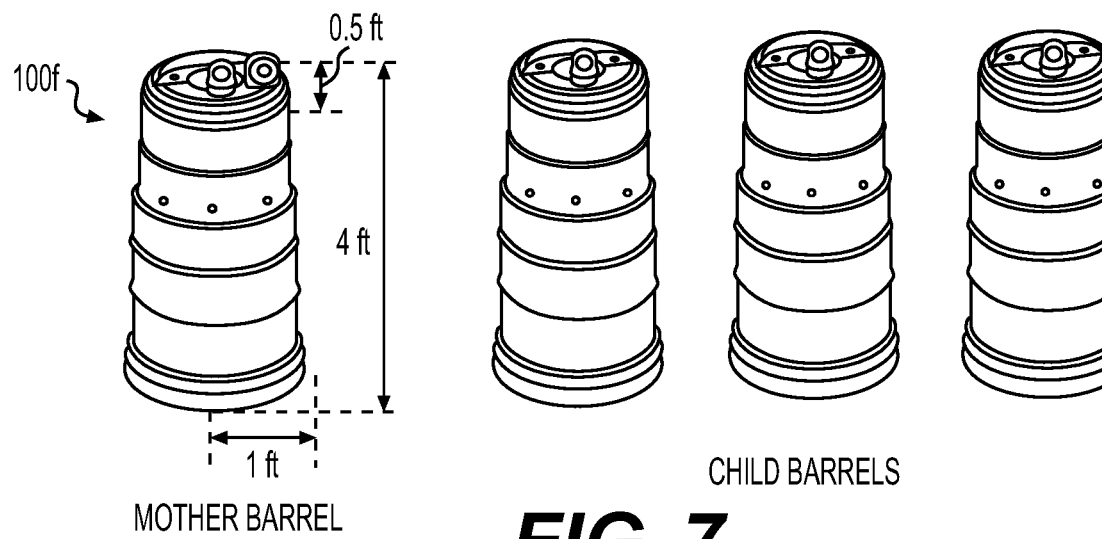
FIG. 7 shows the re-deployable and self-enclosed geofencing and proximity-based intrusion sensing and alerting apparatus of FIG. 1 configured as a barricade in accordance with an illustrative embodiment.
Figure 8:
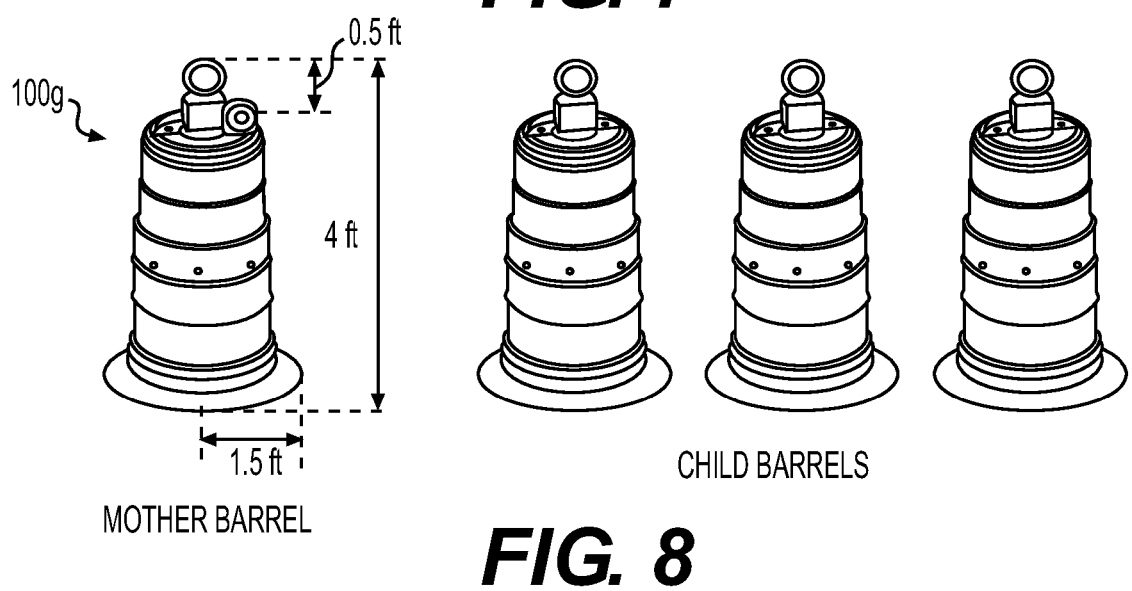
FIG. 8 shows the re-deployable and self-enclosed geofencing and proximity-based intrusion sensing and alerting apparatus of FIG. 1 configured as a roadway drum in accordance with an illustrative embodiment.

FIGS. 6-8 each shows an example re-deployable and self-enclosed geofencing and proximity-based intrusion sensing and alerting system of FIG. 1 configured as various construction or roadway devices in accordance with an illustrative embodiment. FIG. 6 shows the re-deployable and self-enclosed geofencing and proximity-based intrusion sensing and alerting system unit 100 (shown as 100e-1 and 100e-2) of FIG. 1 configured as a safety cone in accordance with an illustrative embodiment. FIG. 7 shows the re-deployable and self-enclosed geofencing and proximity-based intrusion sensing and alerting system unit 100 (shown as 100f-1 and 100f-2) of FIG. 1 configured as a barricade in accordance with an illustrative embodiment. FIG. 8 shows the re-deployable and self-enclosed geofencing and proximity-based intrusion sensing and alerting system unit 100 (shown as 100g-1 and 100g-2) of FIG. 1 configured as a roadway drum in accordance with an illustrative embodiment.

In FIG. 6, a parent intruder detection system unit 100e-1 is shown configured with both a warning light 106 (shown as 106a) and a siren horn 106 (shown as 106b), and a child intruder detection system unit 100e-2 is shown configured only with the warning light 106a. Example dimensions of the parent and child intruder detection system unit 100e-1 are 100e-2 though other dimensions suitable for roadway construction or general construction zones may be used. Similar configurations may be implemented for a barricade device (as shown in FIG. 7) and/or drum device (as shown in FIG. 8).

Cloud-Based Intrusion Monitoring System

Figure 9:
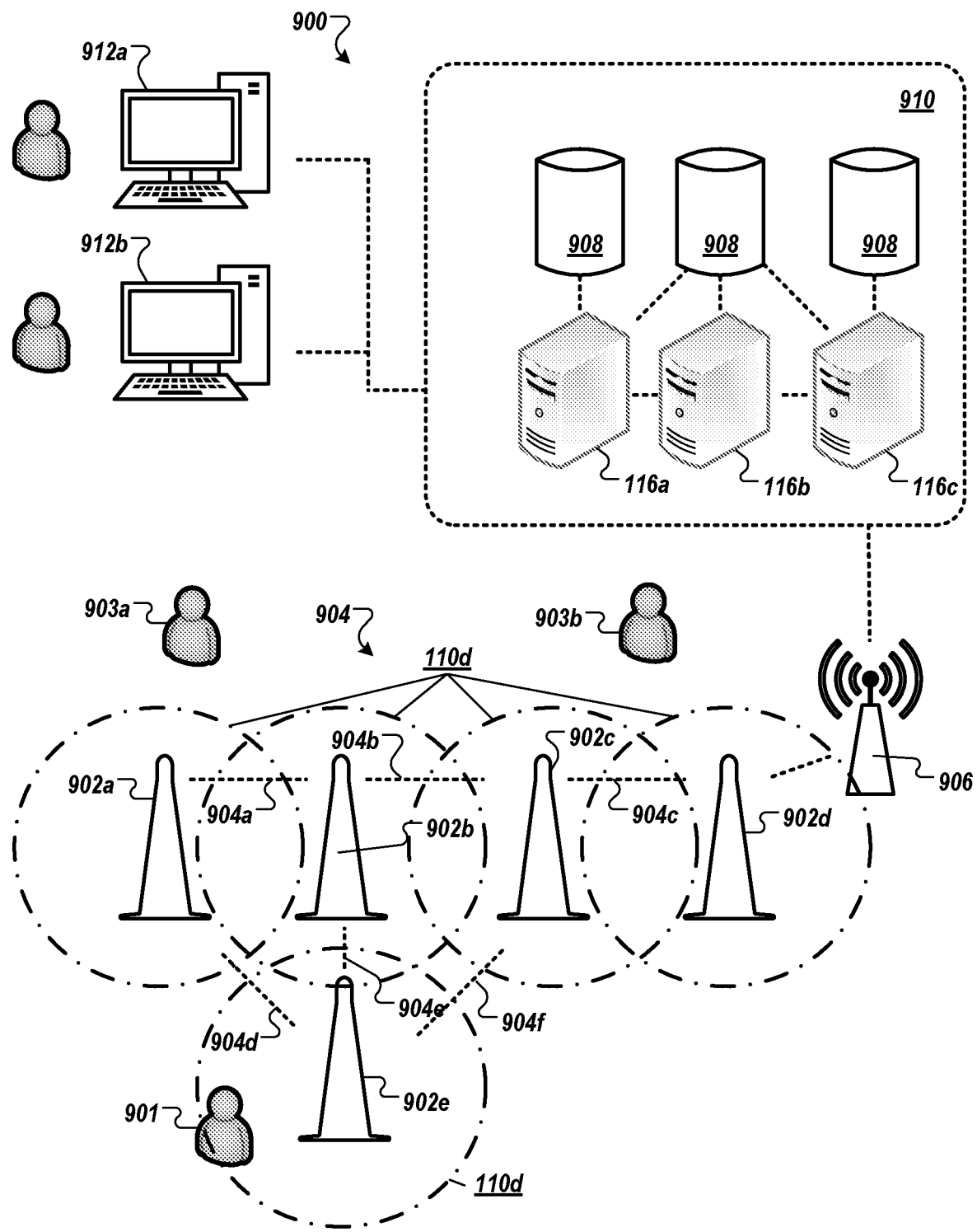
FIG. 9 shows an exemplary cloud-based intrusion monitoring system in accordance with an illustrative embodiment.

FIG. 9 shows an exemplary cloud-based roadway intrusion monitoring system 900 in accordance with an illustrative embodiment. The cloud-based roadway intrusion monitoring system 900 comprises a plurality of intruder detection system units (e.g., 100, 100a, 100b, 100c, 100d, 100e, 100f, 100g, etc.) (shown as 902a, 902b, 902c, 902d, 902e) operatively connected one another by a network communication (shown as 904a, 904b, 904c, 904d, 904e, 904f, 904g) to form a mesh network 904 and to interrogate for an intruder 901 within a detectable area (shown as 110d). One of the intruder detection system units (e.g., a parent unit) operatively communicates to a gateway device 906 that connects, over a high-speed network, to a set of remote computing devices 116 (shown as 116a, 116b, 116c), e.g., established in a cloud infrastructure platform 910. The remote computing devices 116 may be connected to one or more storage area network devices 908. Though preferably implemented in a cloud-based infrastructure, the remote computing devices 116 may be implemented as a remote server or a local server to which some of the remote computing devices 116 may provide services (e.g., web-based services) to curate intrusion-associated data sets to one or more monitoring applications (e.g., web-based applications) executing at corresponding monitoring terminals (shown as 912a, 912b).

As shown in FIG. 9, upon an intruder 901 (though shown as a person, could also an equipment) entering into a sensing zone of the plurality of intruder detection system units, one or more intruder detection system unit (in this example, 902e) sensed the intruder 901 within its proximity. The controller of the intruder detection system unit generates an alert signal output that is used to drive an alert device (e.g., 106) that the unit 902e is configured there with. In instance where the unit 902e is configured only with a flashing light alert system, for example, the flashing light is activated. In instances where the unit 9023 is configured with both a siren horn and the flashing light alert system, both are actuated to inform workers (shown as 903a and 903b) in the vicinity of the intruder detection system units (e.g., 902a, 902b, 902c, 902d, 902e) of the intruder 901.

As described in relation to FIG. 2, the unit 902e then transmits (e.g., step 206) an intrusion event message, or associated data set, through the mesh network 904 to other intruder detection system units (e.g., 902a, 902b, 902c, and 902d), which is configured to also generate output an alert warning of the intruder 901. Further, the intrusion event message, or associated data set, is re-transmitted over the mesh network to the gateway device 906 in real-time, or when available, to update the monitored status of the remote computing device 116. The remote computing device 116 may update the monitored status of an intruder in the roadway or construction work zone at the monitoring station (e.g., 912a, 912b). In some embodiments, the remote computing device 116 is configured to generate an alert notification that is transmitted to a specified device.

To this end, the intruder detection system units (e.g., 902a, 902b, 902c, and 902d) may be used to, collectively, generate an electronic geofence that defines a virtual perimeter in a real-world physical geographic area. The geo-fence is indeed dynamically generated around a point location as individual intruder detection system unit are moved around in the area in which the multiple intruder detection system units communicates over the mesh network to define a boundary.

Figure 10:
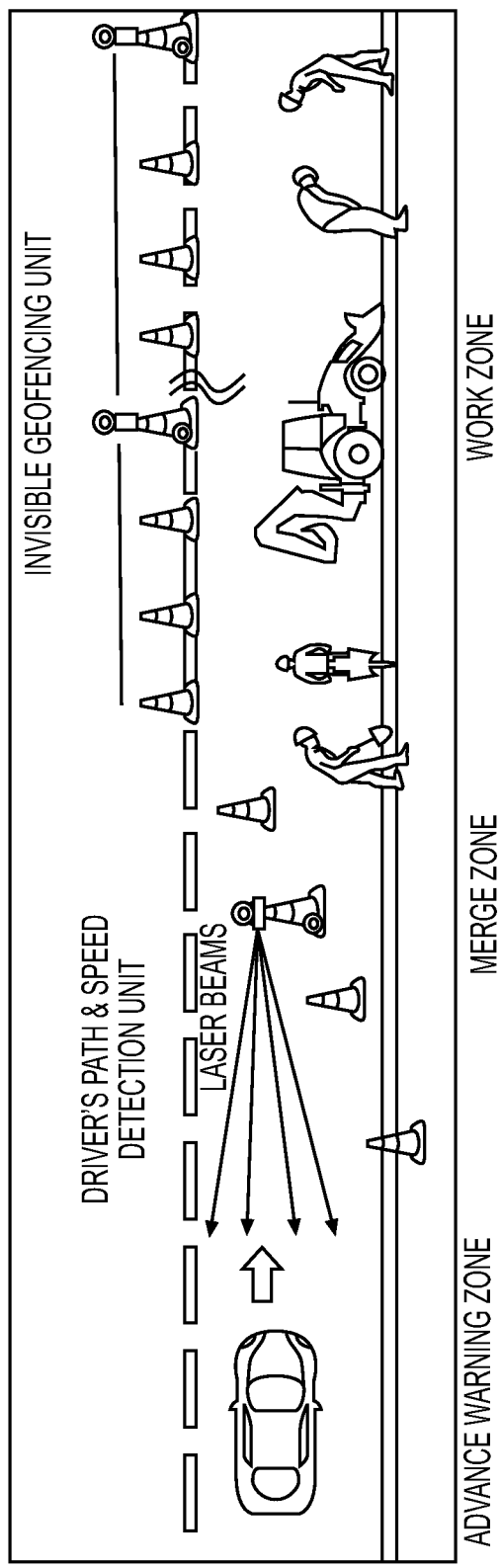
FIG. 10 shows an exemplary scenarios of the use of the cloud-based intrusion monitoring system of FIG. 9 in accordance with an illustrative embodiment.

FIG. 10 shows an exemplary scenarios of the use of the cloud-based roadway intrusion monitoring system of FIG. 9 in accordance with an illustrative embodiment. The intrusion monitoring system of FIG. 9 is used to a long stretch of the work area shown in FIG. 10 as a highway or road work zone. The intruder detection system units (e.g., 902a, 902b, 902c, 902d, 902e) may be configured with LiDAR-based sensors and are placed on the ground to define restricted work area.

In some embodiments, the intruder detection system units of the intrusion monitoring system are first configured to acquire a baseline measurement (e.g., distance) with their respective LiDAR sensors. Additionally, the intrusion monitoring system establishes a mesh network among the intruder detection system units.

Subsequently, if a worker or another person or equipment enters into the restricted area that is detected by a LiDAR sensor of an intruder detection system unit, the intruder detection system unit then outputs an audible or visual alert (e.g., flashing lights and/or a loud siren) to warn the worker. The detecting intruder detection system unit then sends an intrusion event message to other intruder detection system units through the mesh network (e.g., formed with Zigbee communication) and the intrusion event is reported to a cloud server through a connecting Wi-Fi gateway. With LiDAR, the intruder detection system units may have a sensing coverage up to 100 meters, though alerts may be triggered at closer distances. In some embodiments, the distance for the alert may be based on the velocity of the intruder. For example, a person or object traveling at less than 10 feet per second may have a trigger set for a close proximity detection while objects traveling at 30 feet per second or greater is configured with a long-distance proximity detection.

EXAMPLE IMPLEMENTATIONS AND RESULTS

Figure 11:
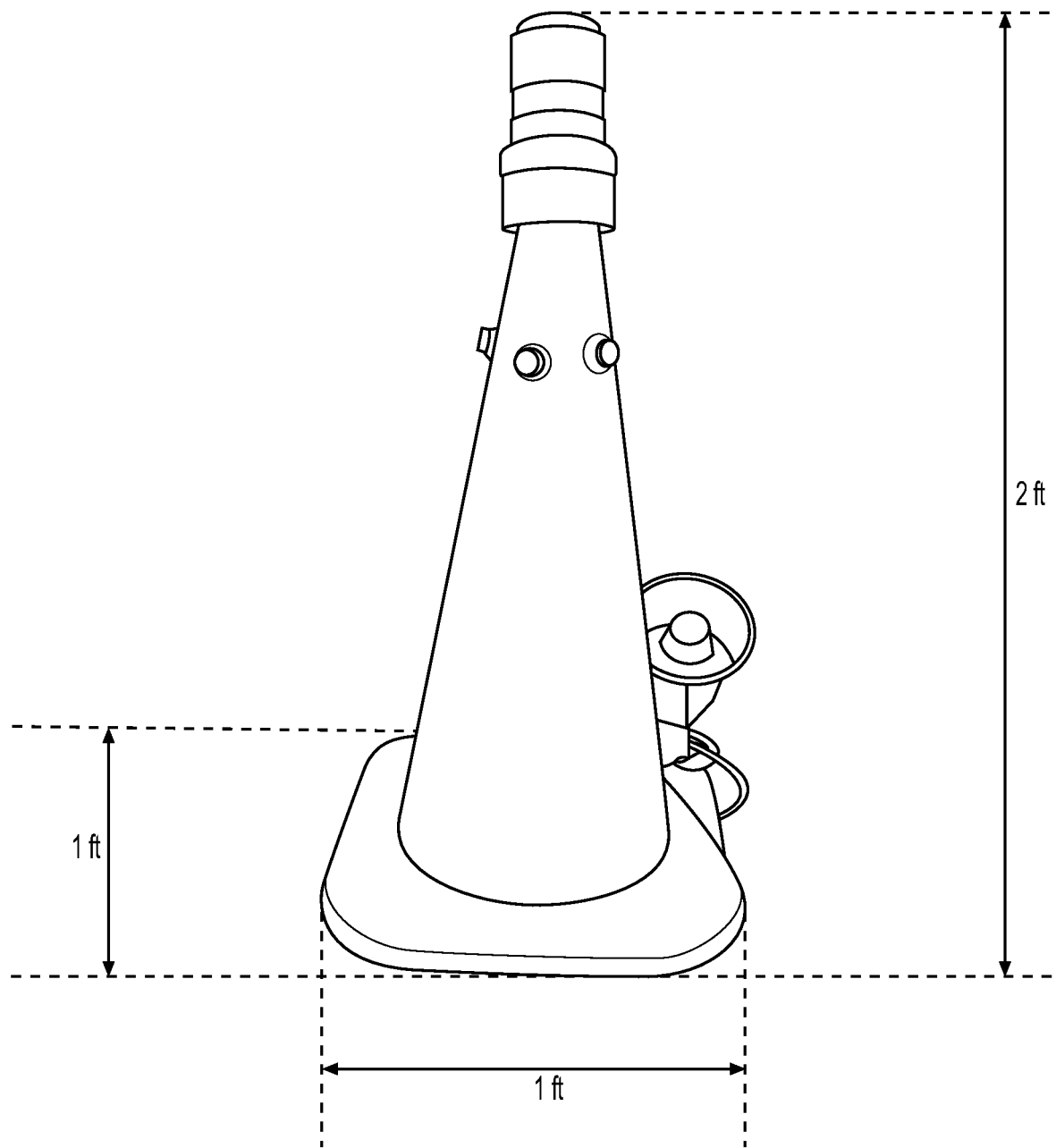
FIG. 11 shows a photograph of a prototype of the exemplary re-deployable and self-enclosed geofencing and proximity-based intrusion sensing and alerting apparatus of FIG. 1 in accordance with an illustrative embodiment.
Figure 12:
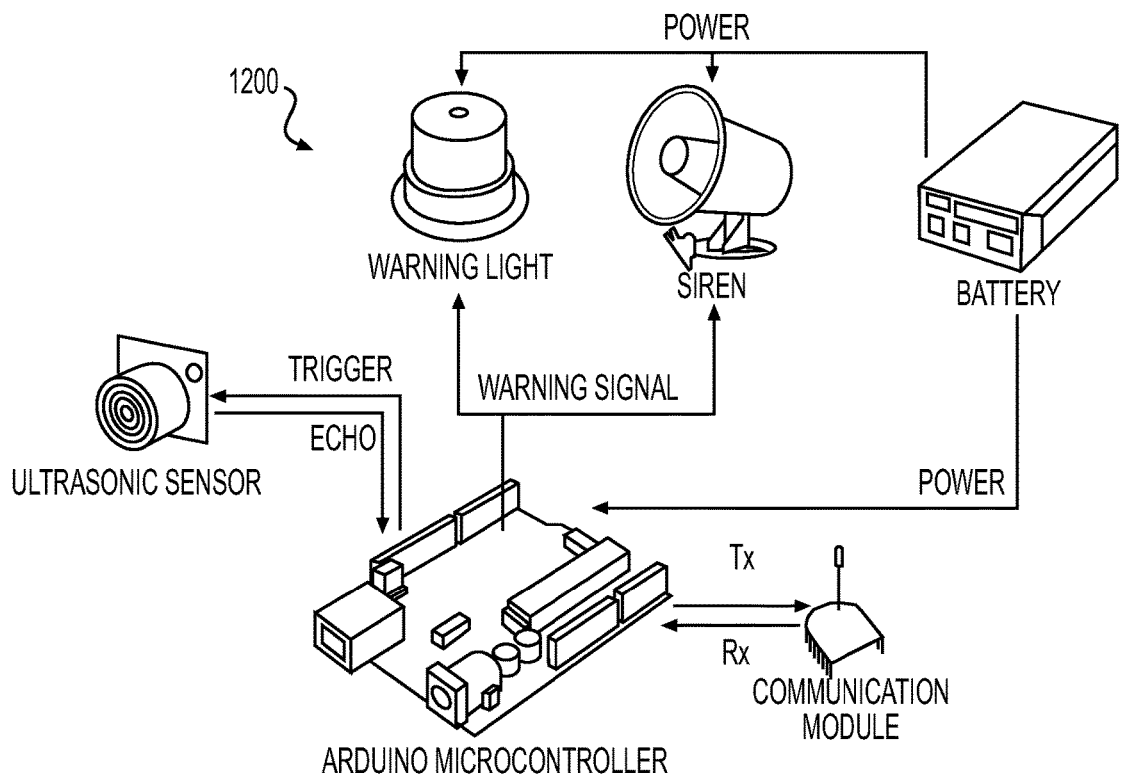
FIG. 12 is a diagram of electronic system of the prototype device of FIG. 11 in accordance with an illustrative embodiment.
Figure 13:
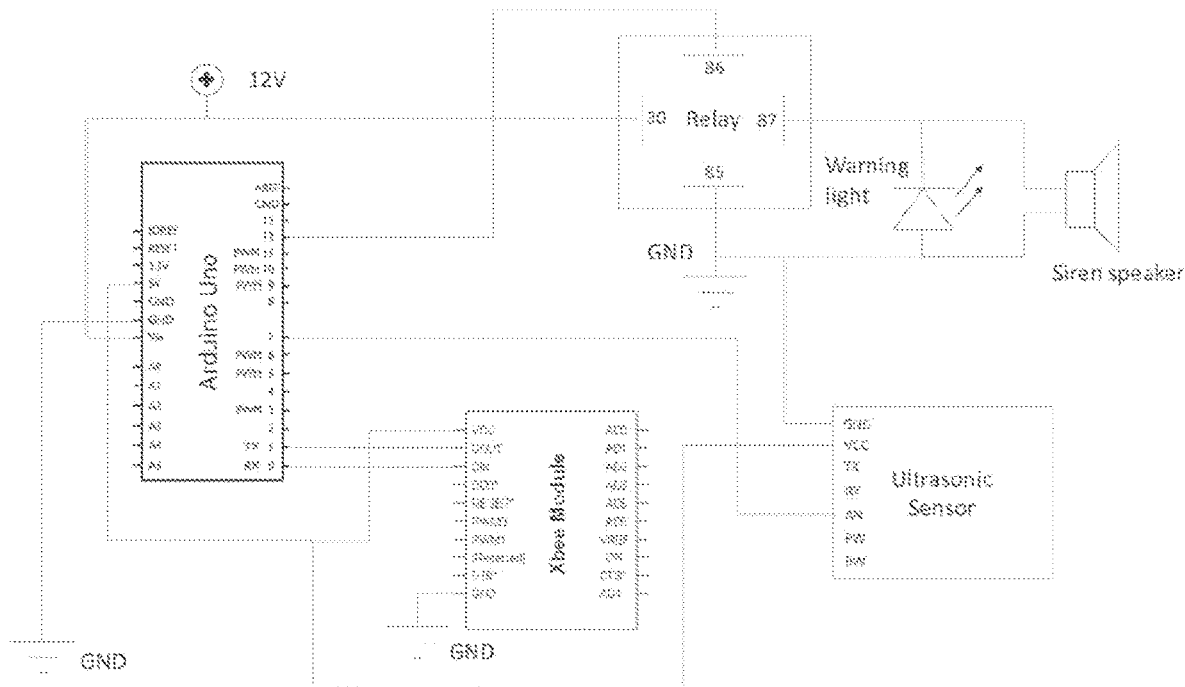
FIG. 13 is an electrical schematic of the electronic system of the prototype device of FIG. 11 in accordance with an illustrative embodiment.

Various aspects of the disclosed technology may be still more fully understood from the following description of example implementations and corresponding results and the images of FIGS. 11-13. Some experimental data are presented herein for purposes of illustration and should not be construed as limiting the scope of the disclosed technology in any way or excluding any alternative or additional embodiments.

FIG. 11 shows a photograph of a prototype of an exemplary re-deployable and self-enclosed geofencing and proximity-based intrusion sensing and alerting system 100 (shown as 100g) of FIG. 1 in accordance with an illustrative embodiment. FIG. 12 is a diagram of electronic system of the prototype device of FIG. 11 in accordance with an illustrative embodiment. FIG. 13 is an electrical schematic of the electronic system of the prototype device of FIG. 11 in accordance with an illustrative embodiment.

The prototype system 100g of FIG. 11 is configured as a parent safety cone that can operate with child safety cones. All the subsystem in the parent and child safety cones in the prototype system 100g are the same except one type (e.g., the parent devices) is configured with sound warning device and Wi-Fi availability and the other type (the child devices) is not. The subsystem of each of the parent and child intruder detection system 100g includes four main components: controller, proximity sensor, warning unit, and power. In the controller of the prototype 100g, an Arduino electronic platform (manufactured by the Arduino project) comprising an AVR core is implemented. The AVR core includes an 8-bit RISC microcontroller configured with on-chip programmable flash memory, SRAM, 10 data outputs/inputs, and EEPROM. The controller is configured, via instructions, to communicate with other intruder detection devices through Zigbee communication and protocol.

In addition, the parent intruder detection cone 100g can communicate with a cloud server via Wi-Fi to update the current intrusion information on the web database in real time. Each of the parent intruder detection cone 100g is configured with three ultrasonic-echo based sensors that serve as a proximity sensors. Each ultrasonic-echo based sensor in the prototype is configured to sense an area of 50 degrees from the sensor to provide a combined coverage of about 150 degrees using the three sensors.

The parent and child prototype systems 100g are configured to operate in concert to detect any intruder (e.g., a worker) in a warning area defined by each of the sub-units. When an intruder is detected, all parent and child prototype systems emit respective warning flashes and loud noise to alert the intruder (worker, cars, etc.). The child prototypes then send the intrusion message and associated information, over its mesh network, to the parent prototype that transmits the data to the cloud server for the monitoring application. Each of the parent and child prototype systems includes a rechargeable 12V Lithium-Ion battery unit to provide continuous use over a number of days from a single charge.

As shown in FIG. 11, the parent and child prototype systems 100g are each configured with a warning flashing light (shown as 106b-1). The parent and child prototype systems 100g each includes three ultrasonic-echo based sensors (shown as 402a-1, 402b-1, and 402c-1) that are each configured to sense up to a range of 20 feet to provide a cumulative maximum sensing area of 180 degrees as configured on the system 100g. The parent prototype system 100g further include a warning siren system 106a-1. Details of the prototype system 100g is provided in Table 1.

TABLE 1

| Controller | MCU | Arduino Uno (+Raspberry Pi for mother safety cone) |
| | Communication | Zigbee, Wi-Fi |

TABLE 1-continued

| Proximity Sensor | Sensor type | Sonar sensor |
| Warning signal | Siren horn | 120 dB |
| | Flashing light | 150,000 Candela |
| Power | Battery type | DC 12 V Li-ion battery |

The parent and child prototype systems 100g may be temporarily placed on the ground around or near dangerous equipment to alert workers from coming into a restricted area. When first placed at a given location, each system is configured to measure a distance measure with each ultrasonic sensor. The controller is configured to request sensor data every 200 milliseconds and applies a mean filtering algorithm to reduce false alarm. If a worker comes into the restricted area and the proximity sensor detects it, the prototype systems warn the worker with flashing lights (and the loud siren, if available) and sends an intrusion event message to other prototype systems through Zigbee communication. The intrusion events are also reported to a cloud server through Wi-Fi (e.g., cell network) to provide site condition monitoring based on such sensing.

Figure 14A:
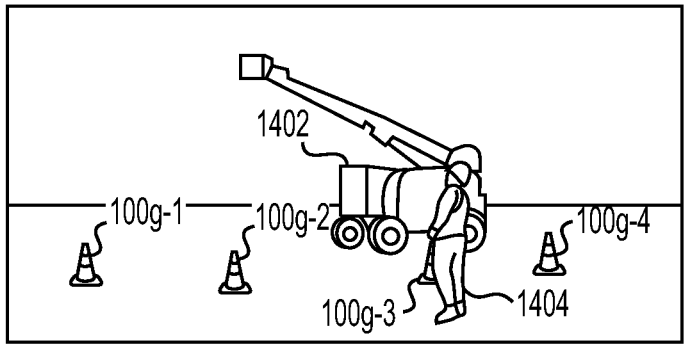
FIGS. 14A-14D shows a sequence of images showing operation of the prototype systems of FIG. 11 in accordance with an illustrative embodiment.
Figure 14B:
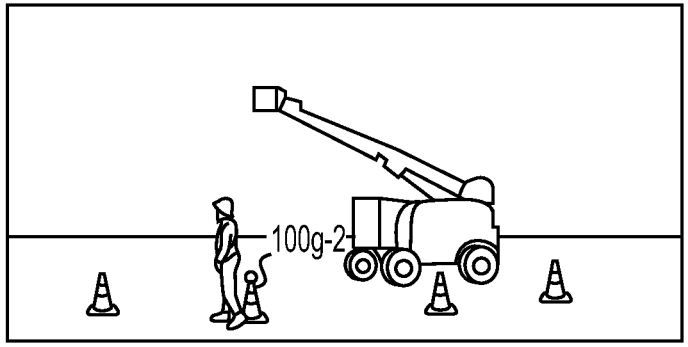
Figure 14C:
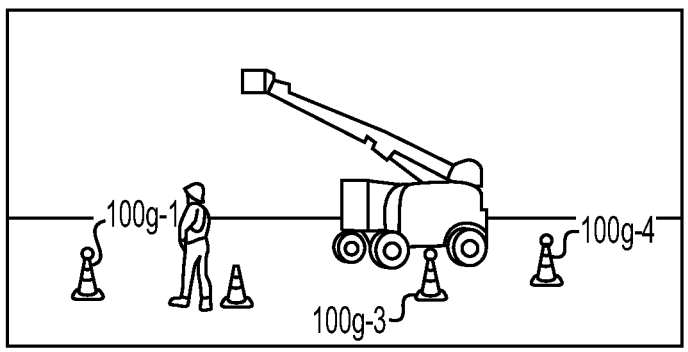
Figure 14D:
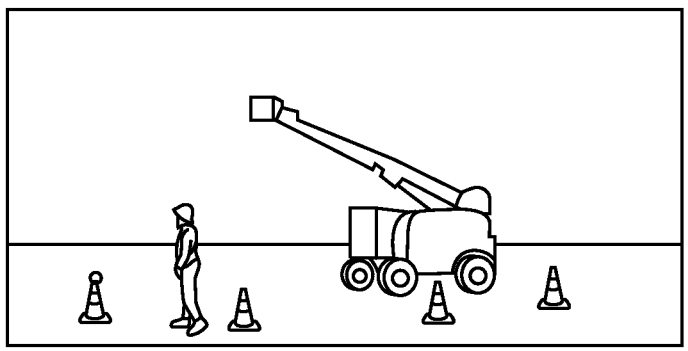

FIGS. 14A-14D shows a sequence of images showing operation of the prototype systems 100g in accordance with an illustrative embodiment. As shown in FIG. 14a, a set of prototype systems (shown as 100g-1 to 100g-4) has been placed around a construction equipment 1402. As a worker 1404 wanders near one of the prototype system (shown as 100g-2), the unit 100g-2 detects presence of the worker and generates an audible and visual alert as shown by the flashing light of the unit 100g-2 as shown in FIG. 14B. Subsequently, within a second of the flashing light of unit 100g-2, the flashing light of unit 100g-1, 100g-3, and 100g-4 are also initiated as shown in FIG. 14C. FIG. 14D shows the worker withdrawing from the area and the alert ceases after about 10 seconds.

A second prototype has been fabricated to demonstrate an invisible fence intruder detection system, e.g., for use in a roadway work zone as described in relation to FIG. 10. The second prototype includes Light Detection and Ranging (LiDAR) sensors as the detection sensor. Table 2 show an example LiDAR-based intruder detection system.

| Controller | MCU | Arduino UNO |
| | Communication | WIFI, Zigbee |
| Proximity Sensor | Sensor type | LIDAR (+actuator for rotation depend on the configuration) |
| Warning signal | Siren horn | 120 dB |
| | Flashing light | 150,000 Candela |
| Power | Battery type | Li-ion battery |

As noted above, FIG. 12 is a diagram of electronic system 1200 of the prototype device (e.g., of FIG. 10 or 11) in accordance with an illustrative embodiment, and FIG. 13 is an electrical schematic of the electronic system of the prototype device of FIG. 11 in accordance with an illustrative embodiment. In FIG. 12, the electronic system 1200 includes a general-purpose low-power computing device.

Computer-executable instructions, such as program modules, being executed by a computer may be used. Generally, program modules include routines, programs, objects, components, data structures, etc. that perform particular tasks or implement particular abstract data types. In its most basic configuration, the controller of FIG. 12 includes at least one processing unit and memory. Depending on the exact configuration and type of computing device, memory may be volatile (such as random-access memory (RAM)), non-volatile (such as read-only memory (ROM), flash memory, etc.), or some combination of the two. The controller of FIG. 12 may have additional features/functionality. For example, computing device may include additional storage (removable and/or non-removable) including, but not limited to, magnetic or optical disks or tape. Such additional storage may include removable storage and/or non-removable storage.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, and wearable devices, for example.

DISCUSSION

Implementation of intrusion alert technologies can reduce the risk to workers and motorists in hazardous areas such as roadway work zone and can lead to fewer worker injuries and fatalities in work zones. The system provides immediate and direct audible and visual alert to roadway construction or general construction workers using loud sirens, flashing lights. In contrast to alerts through a mobile device, the warning via the instant system is immediate and readily discernable over background noise and activity.

In addition, the instant system does not use a mechanical link that form a sensing line to detect intrusion. The instant system can detect intrusion several feet, tens of feet, or hundreds of feet from the sensor to provide earlier detection and warning of potential hazards.

While various embodiments are disclosed, many modifications, variations, alterations, substitutions, and equivalents will be apparent to those skilled in the art. The presented embodiments are not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure (and claims), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A geofencing alert apparatus comprising:
   a proximity sensor unit attachable to a construction or traffic device, the proximity sensor unit comprising a plurality of electromagnetic or acoustic-based sensors that are each configured to emit and receive said emitted respective electromagnetic or acoustic waves, wherein each of the plurality of electromagnetic or acoustic-based sensors is positioned at a different radial position to form an overlapping detectable area;
   a controller coupled to the proximity sensor unit, the controller being configured to generate an alert signal output based on at least one of (i) a determined change in the received emitted electromagnetic or acoustic waves from at least one of the electromagnetic or acoustic-based sensors of the proximity sensor unit, and (ii) a message received through a network from another geofencing alert apparatus, wherein the change is indicative of an intruder object or person in the detectable area covered by the emitted electromagnetic or acoustic waves, and wherein the controller is configured to report intrusion events to a cloud-based system to facilitate site condition monitoring; and
   one or more alert devices each coupled to the controller, wherein the one or more alert devices is configured to generate warning sound or warning visual output based on the alert signal output.

2. The geofencing alert apparatus of claim 1, further comprising:
   a communication device, the controller being coupled to the communication device to direct a stored intrusion event data set having data acquired from at least the geofencing alert apparatus, through a network associated with the communication device, to a remote computing device.

3. The geofencing alert apparatus of claim 2, wherein the stored intrusion event data set includes stored intrusion event data collected at a second geofencing alert apparatus operatively communicating with the geofencing alert apparatus.

4. The geofencing alert apparatus of claim 2, wherein the remote computing device comprises a cloud server, a remote server, or a local server, wherein the remote computing device is configured to store transmitted intrusion event data to be subsequently presented, through curation operation performed by the remote computing device or another computer device, at a monitoring application executing at a monitoring terminal.

5. The geofencing alert apparatus of claim 1, further comprising:
   a low-power communication device, the controller being coupled to the low-power communication device to establish a plurality of links with one or more second geofencing alert apparatuses to form a mesh network.

6. The geofencing alert apparatus of claim 5, wherein each of the one or more second geofencing alert apparatuses is configured to transmit an intruder event message to the geofencing alert apparatus, the controller being configured to generate the alert signal output based on the received intruder event message.

7. The geofencing alert apparatus of claim 5, wherein each of the one or more second geofencing alert apparatuses comprises:
   a respective construction or traffic device;
   a respective proximity sensor unit comprising one or more respective electromagnetic or acoustic-based sensors that are each configured to emit and receive said emitted respective electromagnetic or acoustic waves;
   a respective controller coupled to the respective proximity sensor unit, the controller being configured to determine a change in the received respective emitted electromagnetic or acoustic waves from at least one of the respective electromagnetic or acoustic-based sensor of the respective proximity sensor unit, wherein the change is indicative of an intruder object or person in a respective detectable area covered by the emitted respective electromagnetic or acoustic waves; and
   a respective low-power communication device to establish a plurality of respective links with other one or more second geofencing alert apparatuses and the geofencing alert apparatus.

8. The geofencing alert apparatus of claim 7, wherein the one or more electromagnetic or acoustic-based sensors of the proximity sensor unit comprises:
   a first stationary electromagnetic or acoustic-based sensor and a second stationary electromagnetic or acoustic-based sensor, wherein the first electromagnetic or acoustic-based sensor is disposed along an outward face of the construction or traffic device at a first radial position and the second electromagnetic or acoustic-based sensor is disposed along the outward face of the construction or traffic device at a second radial position different from the first radial position.

9. The geofencing alert apparatus of claim 8, wherein the first stationary electromagnetic or acoustic-based sensor and the second stationary electromagnetic or acoustic-based sensor each comprises an air-based ultrasonic sensor, wherein the proximity sensor unit comprises the first stationary electromagnetic or acoustic-based sensor, the second stationary electromagnetic or acoustic-based sensor, and a third stationary electromagnetic or acoustic-based sensor, wherein each of the first, second, and third electromagnetic or acoustic-based sensors is disposed along the outward face of the construction or traffic device to provide a coverage around the construction or traffic device of at least about 150 degrees.

10. The geofencing alert apparatus of claim 5, wherein the each of the one or more second geofencing alert apparatuses has a different configuration than the geofencing alert apparatus, including not having an alert device.

11. The geofencing alert apparatus of claim 5, wherein the controller is configured to establish, through the mesh network, a link with a third geofencing alert apparatus, wherein the third geofencing alert apparatus is identical in mechanical and system configuration to the geofencing alert apparatus.

12. The geofencing alert apparatus of claim 1, wherein the one or more electromagnetic or acoustic-based sensors of the proximity sensor unit comprises:
a first rotatable electromagnetic or acoustic-based sensor, the first rotatable electromagnetic or acoustic-based sensor being coupled along the outward face of the construction or traffic device or on a top portion of the construction or traffic device to sweep the emitted respective electromagnetic or acoustic waves over a defined sweep coverage region around the construction or traffic device.

13. The geofencing alert apparatus of claim 1, wherein the one or more electromagnetic or acoustic-based sensors of the proximity sensor unit comprises:
an electromagnetic or acoustic-based sensor array comprising a plurality of electromagnetic or acoustic-based sensors that operates, collectively, to sweep the emitted respective electromagnetic or acoustic waves over a defined sweep coverage region around the construction or traffic device.

14. The geofencing alert apparatus of claim 13, wherein the first rotatable electromagnetic or acoustic-based sensor or the electromagnetic or acoustic-based sensor array is configured for LiDAR operation.

15. The geofencing alert apparatus of claim 1, wherein the controller is configured to direct the proximity sensor unit to emit and receive emitted respective electromagnetic or acoustic waves according to a sensing period selected from the group consisting of: about every 100 milliseconds (ms), about every 200 ms, about every 300 ms, about every 400 ms, about every 500 ms, about every 600 ms, about every 700 ms, about every 800 ms, about every 900 ms, and about every 1000 ms.

16. The geofencing alert apparatus of claim 1, wherein the controller or the proximity sensor unit is configured to perform a mean filtering operation on signals associated with the received emitted respective electromagnetic or acoustic waves or a data set associated with said signals to reduce false alarms.

17. A method comprising:
sensing, at an intruder detection system configured with a form factor of a construction or traffic device, an intrusion event corresponding to a change in received electromagnetic or acoustic waves emitted from the intruder detection system, wherein the intruder detection system includes:
a proximity sensor unit attachable to the construction or traffic device, the proximity sensor unit comprising a plurality of electromagnetic or acoustic-based sensors that are each configured to emit and receive said emitted respective electromagnetic or acoustic waves, wherein each of the plurality of electromagnetic or acoustic-based sensors is positioned at a different radial position to form an overlapping detectable area, and
a controller coupled to the proximity sensor unit configured to report intrusion events to a cloud-based server to facilitate site condition monitoring; and
generating, by the controller and at the intruder detection system, a warning sound and/or warning visual output based on the sensing based on at least one of (i) a determined change in the received emitted electromagnetic or acoustic waves from at least one of the electromagnetic or acoustic-based sensors of the proximity sensor unit, and (ii) a message received through a network from another intruder detection system, wherein the change is indicative of an intruder object or person in the detectable area covered by the emitted electromagnetic or acoustic waves.

18. The method of claim 17, further comprising:
transmitting, from the intruder detection system, through a network, to a remote computing device selected from the group consisting of a cloud server, a remote server, and a local server, intrusion event data set associated with intrusion event collected at the intruder detection system, wherein the remote computing device is configured to store the transmitted intrusion event data set, wherein the transmitted intrusion event data set is subsequently presented, through curation operation performed by the remote computing device or another computer device, at a monitoring application executing at a monitoring terminal.

19. The method of claim 18, further comprising:
receiving, at the intruder detection system, from a second intruder detection system communicatively coupled to the intruder detection system over a meshed network, intrusion event messages collected at the second intruder detection system,
wherein the transmitted event data set includes intrusion events information collected at the intruder detection system and intrusion events information collected at the second intruder detection system.

20. A cloud-based monitoring system comprising:
a plurality of geofencing alert apparatuses, each of the plurality of geofencing alert apparatuses configured in a form-factor of a construction or traffic device, each of the plurality of geofencing alert apparatuses comprising:
i) a proximity sensor unit having one or more electromagnetic or acoustic-based sensors that are each configured to emit and receive respective electromagnetic or acoustic waves, wherein each of the plurality of electromagnetic or acoustic-based sensors is positioned at a different radial position to form an overlapping detectable area, and wherein the proximity sensor unit is configured to report intrusion events to a cloud-based server to facilitate site condition monitoring,
ii) a controller configured to generate an alert signal output based on a determined change in the received emitted electromagnetic or acoustic wave from at least one of the electromagnetic or acoustic-based sensor of the proximity sensor unit, wherein the change is indicative of an intruder object or person in the detectable area covered by the emitted electromagnetic or acoustic waves, and iii) a communication device to direct a stored intrusion event data set having data acquired from at least the geofencing alert apparatus, through a network associated with the communication device, to one or more servers, the one or more servers configured to store intrusion event data set having data acquired from the plurality of geofencing alert apparatuses, wherein the one or more servers is configured to curate the intrusion event data set to a monitoring application executing at a monitoring terminal.

* * * * *

UNITED STATES PATENT AND TRADEMARK OFFICE
CERTIFICATE OF CORRECTION

| | | |
|---|---|---|
| PATENT NO. | : 12,020,558 B2 | Page 1 of 1 |
| APPLICATION NO. | : 17/440263 | |
| DATED | : June 25, 2024 | |
| INVENTOR(S) | : Young Cho et al. | |

It is certified that error appears in the above-identified patent and that said Letters Patent is hereby corrected as shown below:

In the Specification

Column 1, Line 7 (approx.), Delete "US" and insert -- U.S. --.

Column 1, Line 10 (approx.), Delete "U.S.C" and insert -- U.S.C. --.

Signed and Sealed this
Seventeenth Day of December, 2024

Derrick Brent
*Acting Director of the United States Patent and Trademark Office*